United States Patent
Crowell

(10) Patent No.: US 9,641,262 B2
(45) Date of Patent: May 2, 2017

(54) METHOD AND APPARATUS FOR UNDERWATER ACOUSTIC COMMUNICATION

(71) Applicant: TRACKSERVER, INC., Fall River, MA (US)

(72) Inventor: Jonathan C. Crowell, Dorchester, MA (US)

(73) Assignee: OceanServer Technology, Inc., Fall River, MA (US)

(*) Notice: Subject to any disclaimer, the term of this patent is extended or adjusted under 35 U.S.C. 154(b) by 206 days.

(21) Appl. No.: 14/674,477

(22) Filed: Mar. 31, 2015

(65) Prior Publication Data

US 2015/0288459 A1 Oct. 8, 2015

Related U.S. Application Data

(60) Provisional application No. 61/975,125, filed on Apr. 4, 2014.

(51) Int. Cl.
*H04B 13/02* (2006.01)
*H04B 11/00* (2006.01)

(52) U.S. Cl.
CPC ............. *H04B 13/02* (2013.01); *H04B 11/00* (2013.01)

(58) Field of Classification Search
CPC ................................ H04B 13/02; H04B 11/00
See application file for complete search history.

(56) References Cited

U.S. PATENT DOCUMENTS

| 5,124,955 A | 6/1992 | Jackson et al. |
| 5,784,339 A | 7/1998 | Woodsum et al. |
| 7,859,944 B2 | 12/2010 | Zhou et al. |
| 8,009,515 B2 | 8/2011 | Cecala et al. |
| 8,009,516 B2 | 8/2011 | Crowell |
| 2003/0061002 A1 | 3/2003 | Steinbrecher |

(Continued)

FOREIGN PATENT DOCUMENTS

| CA | 2054915 A1 | 6/1992 | |
| WO | WO 2015153576 A3 * | 11/2015 | ............. H04B 11/00 |

OTHER PUBLICATIONS

International Search Report and Written Opinion for Application No. PCT/US15/23541, mailed Jul. 21, 2015 (9 pages).

(Continued)

*Primary Examiner* — Daniel Pihulic
(74) *Attorney, Agent, or Firm* — Nutter McClennen & Fish LLP

(57) ABSTRACT

Systems and methods are disclosed allowing for spatially separated nodes to transmit data to a single remote master receiver node in a synchronized way. Slave nodes can send acoustic data so that it travels through water and arrives at the master node exactly timed so that the data bit appears in a predetermined time slot. The next time slot could be a data bit coming from another remote or slave node in another direction and at a different distance. This can be repeated for many nodes and the incoming bits will be received in a time division multiplexed fashion at the receiver or master node. The senders address and bit meaning are implicit due to the time slot in which they arrive. The assumption is that all nodes have accurate synchronized time as well as the ability to accurately estimate sound travel time between itself and any master node.

16 Claims, 1 Drawing Sheet

(56) References Cited

U.S. PATENT DOCUMENTS

| | | |
|---|---|---|
| 2004/0090865 A1 | 5/2004 | Davies et al. |
| 2005/0219950 A1 | 10/2005 | Rowe |
| 2008/0037370 A1 | 2/2008 | Crowell |
| 2009/0196122 A1 | 8/2009 | Crowell |
| 2011/0096632 A1 | 4/2011 | Pearce et al. |
| 2011/0144930 A1 | 6/2011 | Bruno et al. |
| 2012/0213034 A1 | 8/2012 | Imran |
| 2013/0003498 A1 | 1/2013 | L'Her et al. |
| 2015/0288459 A1* | 10/2015 | Crowell ............ H04B 13/02 367/131 |

OTHER PUBLICATIONS

Molins, et al., Slotted FAMA: A MAC protocol for underwater acoustic networks. Massachusetts Institute of Technology. Proceedings of the IEEE OCEANS '06 Asia Conference, pp. 1-7, May 2006.

Noh, et al., DOTS: A propagation delay-aware opportunistic MAC protocol for underwater sensor networks. 2010 IEEE International Conference on Network Protocols (ICNP), Oct. 5-8, 2010, pp. 183-192.

Tin, et al., Network burst monitoring and detection based on fractal dimension with adaptive time-slot monitoring mechanism. Journal of Marine Science and Technology, vol. 21, No. 6, pp. 686-694 (2013).

* cited by examiner

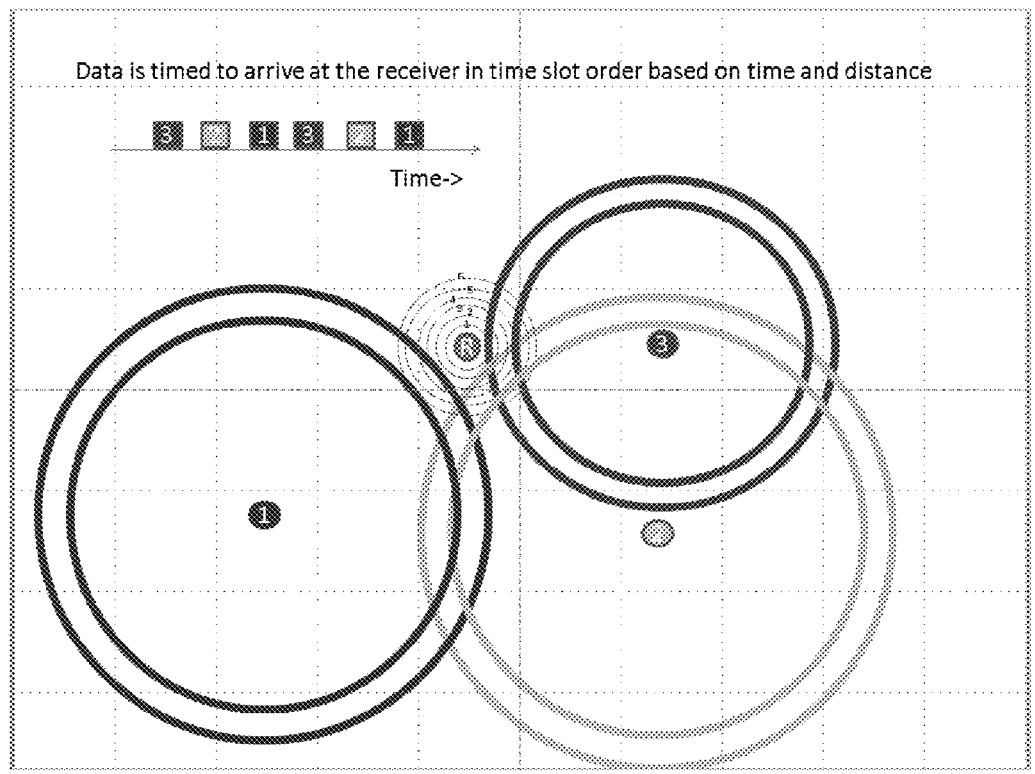

METHOD AND APPARATUS FOR UNDERWATER ACOUSTIC COMMUNICATION

CROSS-REFERENCE TO RELATED APPLICATIONS

This application claims priority to U.S. Provisional Application No. 61/975,125, filed on Apr. 4, 2014, which is hereby incorporated herein by reference in its entirety.

FIELD

The present disclosure relates to methods and apparatuses for underwater acoustic communication.

BACKGROUND

Underwater acoustic communication can be a very challenging problem due to the fundamental attributes of the underwater sound channel. These attributes include low bandwidth, long propagation delay caused by the low speed of sound in water, and noise generated by the data transmission, such as multi-path, ray bending and reflections (echoes).

If an acoustic transmitter sends data underwater to a remote node, the data radiates out in all directions (it is omni-directional) and its amplitude reduces according to the cube of its distance from the transmitter. Because the sound speed in seawater is approximately 1500 m/s, and the usable range of sending data is on the order of 2 km at a frequency 25 KHz, you have to wait after data is transmitted until all the energy propagates out of the area of interest in order to avoid interference. In the simple case of two nodes sending data back and forth at distance of 1.5 km, it will take 1 second for the first bits to arrive at the distant node. If that node sends a handshake back this will add another 1 second delay.

These attributes, especially the long propagation delays and low bit rates, make underwater acoustic networks fundamentally different from wireless packet networks. As a consequence, many of the network protocols designed for wireless packet networks are either not applicable, or have extremely low efficiency over underwater acoustic channels. Accordingly, improvements in the transfer of information over underwater acoustic networks are needed.

SUMMARY

Methods for communicating data underwater between at least one master node and a plurality of slave nodes are provided. A method for communicating data underwater between at least one master node and a plurality of slave nodes, the master and slave nodes having synchronized clocks, can include defining time slots during which the master node will receive data from at least one slave node, a slave node calculating, using a processor having access to information regarding a distance between the slave node and the master node, a time to acoustically transmit data so that the acoustically transmitted data is received by the master node during a defined time slot, the slave node, at the calculated time, acoustically transmitting the data, and receiving the data transmitted by the slave node at the master node during the defined time slot.

The method can vary in any number of ways. For example, a plurality of slave nodes calculate, each slave node using a processor having access to information regarding a distance between the respective slave node and the master node, a time to acoustically transmit data so that the acoustically transmitted data is received by the master node during a defined time slot. Each slave node acoustically transmits data so that the master node receives the data during a defined time slot. In certain aspects, each slave node acoustically transmits data so that the master node receives the data during the same defined time slot. In other aspects, each slave node acoustically transmits data so that the master node receives the data during different defined time slots for each slave node. The time slots can be defined in various ways, such as statically or dynamically.

The system can include a plurality of master nodes with each master node receiving acoustic transmissions at different frequencies. In some embodiments, the master node receives acoustic transmissions having at least first and second frequencies. In certain aspects, the slave nodes communicate with the master node at the first frequency when a distance between the slave node and the master node is greater than a first threshold distance. In certain aspects, the slave nodes communicate with the master node at the second frequency when a distance between the slave node and the master node is less than a second threshold distance.

A receiving node can vary in any number of ways. In certain aspects, a receiving node detects a Doppler shift in the frequency of a received acoustic transmission, and uses the Doppler shift to validate the acoustic transmission. In certain aspects, a receiving node detects a signal amplitude of a received acoustic transmission, and uses the signal amplitude to validate the acoustic transmission. In other aspects, a receiving node detects a tone envelope shape of a received acoustic transmission, and uses the tone envelope shape to validate the acoustic transmission.

The data can be coded in various ways. For one example, the data is coded using phase shift keying in the defined time slots. For another example, the data is coded using frequency shift keying in the defined time slots.

The present invention further provides devices and methods as claimed.

BRIEF DESCRIPTION OF THE DRAWING

The invention will be more fully understood from the following detailed description taken in conjunction with the accompanying drawing, in which:

The FIGURE is a diagram illustrating receiver synchronized time slot data flow.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawing. Those skilled in the art will understand that the devices and methods specifically described herein and illustrated in the accompanying drawing are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Systems and methods of the present invention allow for a large number of spatially separated nodes to transmit data to a single remote master receiver node in a tightly synchronized way. Slave nodes can send acoustic data so that it travels through the water and arrives at the master node exactly timed so that the data bit appears in a predetermined time slot. The next time slot could be a data bit coming from another remote or slave node in another direction and at a different distance. This process could repeat for many nodes and the incoming bits will be received in a time division multiplexed fashion at the receiver or master node. The time slots are predetermined or agreed upon on a system-wide basis by a static or dynamic allocation scheme. The senders address and the bit meaning are implicit due to the time slot that they arrive at the master receiver node. The assumption is that all nodes have accurate synchronized time as well as the ability to estimate very accurately the sound travel time between itself and any master node it needs communicate with.

The FIGURE illustrates an exemplary system where three slave nodes (1, 2, and 3) are sending data to a master receiver node (R). The sequence shown has node 3 sending a bit, then node 2, then node 1, then node 3, then 2 then 1. The bits arrive in order in the predetermined or agreed upon time slots based upon a synchronized clock timing among the slave and master nodes. The slave nodes account for the travel time of the data stream in water so as to be correctly ordered and timed at the master node.

Deployment of the invention provides significant advantages. Despite that data generally is transmitted using omnidirectional acoustic transducers and the data radiates circularly from each slave as it sends data, the timing of the transmission has the data order and framing exactly correct at the master receiver node. The data stream as viewed from other points in the transmission medium can look very confused, with overlapping, inverted order, cancellation, etc, basically not meaningful—but, at the desired receiver, the data is correctly ordered. This has significant benefits compared to traditional acoustic modem schemes including that there is no overhead for framing, addressing, channels settling time, etc. It also has the benefit that the transmitter nodes can have a very low duty cycle time, important since acoustic signals have significant electrical power needs during transmission, spreading out the transmissions makes for lower cost systems. When each bit passes the master receiver the channel is clear except for any noise that may flow in.

The master nodes can also send data back to the slave devices in time slots when the transmission is sent synchronously from the master's clock. Each of the slaves will use the known delay from the master to themselves and re-frame the data. The data (if any) will arrive in an agreed upon time slot. The data from the master to the slaves can be at a different frequency than the data from the slaves to the masters to avoid interference.

Systems and methods of the invention require that master and slave nodes have synchronized time that is accurate, as well as a very accurate knowledge of the sound travel time between a transmitting slave node and the specific master node receiving the data. The synchronized time requirement can be solved, for example, with either oven stabilized trained oscillators or chip scale atomic clocks such as the Symmetricon SA.45 Chip Scale Atomic Clock. Determining the sound travel distance to each master node is a more difficult problem. U.S. Pat. No. 8,009,516, incorporated herein by reference in its entirety, discloses an underwater positioning system having the properties that all devices are time synchronized and they know their location and more specifically, and thus the sound travel time between each device (slave nodes) and the beacons/buoys (master nodes). When this system or other systems that provide the same information are deployed, the systems and methods of the present invention are easily enabled.

The system of U.S. Pat. No. 8,009,516 uses two or more buoys/beacons to send the acoustic timing data to the devices that need to calculate their positions. The present invention can reuse the existing devices, accurate clocks, acoustic transceivers, processors and can layer this data transfer system on to the positioning system for very little added cost.

A system with many masters can allow each master to operate on a unique frequency. These frequencies could also be reused when the master buoy is a sufficient distance from another master node using the same frequency. Acoustic transducers have a fairly broad operational frequency range from a single hardware set. It is not unreasonable to be able to support operation at 10 discrete frequencies in both transmission and reception. By way of example, we can call these frequencies 1-10, and show a system with four positioning beacons/buoys (master nodes). Table 1 shows an exemplary assignment of unique frequencies that would allow a system with four positioning system buoys to offer positioning data on two frequencies and full duplex data between all slaves and any masters on unique channels (frequencies). Table 1 is an example showing an assignment of frequencies between different nodes.

TABLE 1

Example showing an assignment of frequencies between different nodes

| | Positioning Freq | Receive Frequency | Transmit Frequency |
|---|---|---|---|
| Master Node A | 1 | 2 | 3 |
| Master Node B | 2 | 4 | 5 |
| Master Node C | 1 | 6 | 7 |
| Master Node D | 2 | 8 | 9 |

Acoustic signal loss increases over distance in water as the frequency increases. This means that higher frequency signals have shorter effective ranges. However, lower frequencies can carry less data as the wave length is longer. Table 2 provides some general guidance on underwater acoustic frequencies and the maximum ranges.

TABLE 2

Frequency Bands and Maximum Range

| | Frequency Range | Maximum Range* |
|---|---|---|
| Low Frequency (LF) | 8 kHz to 16 kHz | >10 km |
| Medium Frequency (MF) | 18 kHz to 36 kHz | 2 km to 3.5 km |
| High Frequency (HF) | 30 kHz to 60 kHz | 1,500 m |
| Extra High Frequency (EHF) | 50 kHz to 110 kHz | <1,000 m |
| Very High Frequency (VHF) | 200 kHz to 300 kHz | <100 m |

*This assumes in band noise on the surface vessel, at the transceiver, to be less than 95 dB and the source level of the beacon to be >195 dB re 1 µPa@ 1 m.

Additional transducers could be added at higher frequencies to allow master nodes to have transceivers at multiple frequencies. These higher frequency channels could be used when slaves are closer to the master in order to send data at a higher rate. The higher frequencies signal strength decays much quicker and in many cases could be reused on every master for close range data transfer.

The embodiments described so far have used a simple tone based scheme to code for binary data. If the tone is present a binary 1 is coded, no signal the data is a binary 0.

This is a very simple scheme that uses a narrow bandwidth, the tone plus any Doppler shift caused by the slave nodes motion toward or away from the master node as they operate. Any acoustic data modulation scheme can be defined in the time slots from a slave, as well as the size of the time slots adjusted for size. Some schemes include PSK (Phase shift keying) or FSK (Frequency shift keying); all of these use a channel of a wider frequency. The time slot still implies who sent the data as well the data definition.

Such systems would support different bit rates based on distance between nodes as well as the sound frequency used. The mapping of time slots to definitions can be done in any number of schemes to accommodate the requirements. These could be dynamically or softly configured in any number of ways.

Assuming the simple mode of operation where all data is a simple pure sound wave of an accurate frequency, some non-obvious benefits of the system are as follows: The slaves know their speed relative to the master node when receiving data—as the frequency will be shifted by the Doppler Effect, the received data can be tested in frequency to verify it is as expected. The amplitude of the signal is a function of the distance it has traveled, so its amplitude can also be checked to qualify that the data is valid. Another feature of acoustic transmitters is that as you start them ringing they have a very characteristic envelope of the signals starting small, reaching amplitude and then decaying as you stop, as well as the length of tone. These checks can be yet another parity check of the validity of the data at the receiver.

Example 1

As an illustrative embodiment of the invention, a system at a given frequency can support communications between Master A and 64 unique slaves with ID's from 0-63. The system can be defined as having bits that are 2 ms each, allowing 500 bits per second. This data flow can be broken down into 60 bytes and 20 parity bits every cycle—that is, in this example, every second. The system can be defined as shown in Table 3 below and allows data to flow between the master and slaves in a way where the slaves can request data slots and they are granted in the next cycle. The data is sent back to the master in the next request cycle.

TABLE 3

Example data defination for the 500 bits that can move in a 1 second cycle @ 500 bps rate.

Master to Slave Data Slots, 500 bits (60 bytes + 20 parity bits), Sent every cycle
    Channel Grants: 2 × 16 byte, 2 × 8 byte, 6 × 2 byte; 10 × (slave id = 1 byte)
        10 Bytes + 8 bitHamming
    Large Messages; 3 × (slave id = 1 byte, message type = 1 byte, data = 10 bytes)
    Small Messages; 3 × (slave id = 1 byte, message type = 1 byte, data = 2 bytes)
        3 × 12 + 3 × 4 = 48 Bytes + 11 bitHamming
    Broadcast Message; type = 1 bytes, data = 2 bytes
        2 Bytes + 1 bitParity
Slaves to Master Data Slots, 500 bits (60 bytes + 20 parity bits), sent every cycle
    Channel Requests: 64 × 2 bits, Code0 = No data, 01 = 2 Bytes, 2 = 8 Bytes, 3 = 16 Bytes
        8 Bytes, no parity
    Data Slots: 2 × (16 Byte + 5 bit parity, 1 × (8 Byte + 4 bit parity), 6 × (2 Byte + 1 bit parity)
        2 × 16 + 1 × 8 + 6 × 2 = 60 bytes + 20 Parity bits The exemplary system in Table 3 has the following features; Slaves to Master, each node sends 2 bits each second to the master, the slot tells who sent the data (implied ID of 6 bits, 63 unique address, zero is not used). These two bits are NO data=0, no request to send the host data, codes of 1=2 byte data field, 2=8 bytes of data to send, code of 3=16 bytes of data requested. In the same 1 second, data sent from slaves to the host are the data from each slave if that was a given channel in the last master to slave message.

The Master to slave data frame has 10 bytes defined to show the grants that are being offered to the slaves. The bytes are in order of the data chunks, 16 byte+4 parity bits, and so one. If the field has a value of "0", no one wants the inbound slot for data; there are no requests. If the value is between 1-63, the node identified by the value can send new data. If the Top bit is set, that tells that node that the last data failed due to parity and they should retry that data packet. The parity bits and Hamming codes in the data are scattered, for example. In this simple scheme, up to 63 nodes can request data channels dynamically and send data on demand. At higher frequencies there could easily be 10,000 bits possible in a 1 second frame at a close distance between the master and slave nodes. Devices could move close to Master nodes to dump data to them at a high rate. In a typical system described in U.S. Pat. No. 8,009,516, the station keeping buoys can have a float on the water surface and be operating very high bandwidth radios between the beacons as well as data being sent to internet through systems such as Iridium. The data could be moved anywhere quickly with a small delay of a few seconds.

Example Two

In this example, a simple data structure is provided to illustrate an exemplary operation of the invention. In this example, one master is communicating with 16 slaves (with ID numbers 0-15) and the system is configured to provide two "small message" channels and one large message channel. In this system, a slave data structure might be represented as shown in Table 4 below.

TABLE 4

Exemplary slave data structure

| Request Small Message | Request Large Message | Small Message One | Small Message Two | Large Message |
|---|---|---|---|---|
| 0-15 | 0-15 | Data or Null | Data or Null | Data or Null |

This data would be transmitted by a slave so as to arrive during a "receive" time slot on the master node. If the slave wished to request a small message and/or a large message channel, it would turn on the bit corresponding with its ID for the appropriate sized channel.

A master data structure responsive to the data received from the slaves can be represented as shown in Table 5 below.

TABLE 5

Exemplary Master Data Structure

| Grant Small Message One | Grant Small Message Two | Grant Large Message | Data |
|---|---|---|---|
| 0-15 | 0-15 | 0-15 | Data or Null |

In response to requests for a small or large message channel, the master responds by turning on the bit corresponding to the ID of the slave that is allowed to transmit data on small message one, small message two, and/or large message channels during the next "receive" time slot. Slaves who had been granted permission could load data into the corresponding channel during the next cycle.

Example Three

The following example shows a data structure and flow that allows the MASTER to send data to slaves. This data design supports 15 different slave devices with unique ID's from 1 to 15. This description is the data transport level, i.e., how nodes send binary data between each other and manage coordination of the shared transmission channel.

The data definition is defined by a higher level. TCP/IP or other network schemes can even be implemented by breaking the higher level messages into data chunks that are supported by this transport system.

TABLE 6

Data Rate and Frame Size

| Master to Slave Data bit time and frame size | | Slaves to Master Data bit time and frame size | |
|---|---|---|---|
| Bit time (seconds) | Frame size (seconds) | Bit time (seconds) | Frame size (seconds) |
| 1/512 | 1 | 1/512 | 1 |

The bitrate possible is determined by the water acoustic channel bandwidth and noise. In this example, there are 512 time slots per second, each 1/512 of a second, and a frame size of 1 second for a total of 512 bits. This can be scaled up or down based on the physics. In this example, a binary 1 is sent by sending a tone of 32 KHz for 1 ms centered in the middle of the bit time. A zero is no tone transmitted. Alternate schemes could use two different frequencies, FSK (frequency shift keying), this would send sound data for every bit in the frame.

Each second the master transmits a fixed format frame; there are two frame formats, M0FRAME and M1FRAME. The M0FRAME is sent on even seconds, 0, 2, 4 . . . the M1FRAME is sent on odd seconds, 1, 3, 5, and so on. The Master data flows from the master and is broadcast to all slave devices in range, by the addresses in each data block they know if the data is directed to them. If the address 255 is present, it is a broadcast message and they all receive the data.

The M0FRAME provides the grants to all slaves, authorizing specific slaves to send data back to the Master. The grants are for IDs that had active requests in the previous slave to master cycle. The grants are for the next two slave cycles, and then a new M0FRAME issues new grants for the next two cycles. The master would use some allocation scheme to provide the required level of access, typically round robin or priority based.

There are two frames defined from the slave devices, these are broad call frames where bits can come from all slaves, timed such as to arrive at the Master in proper bit order as if they had come from a single source in space. These frames are S0FRAME and S1FRAME; these contain the requests bits for next pair of FRAMES from the slaves as well as the defined data slots. The S0FRAME is sent in the cycle after the M0FRAME so that the sequence will go REQUEST then GRANT in the next cycle. S0FRAME is sent on odd cycles, S1FRAME is sent on even cycles. This forms a simple state machine where slaves will set request bits and use the grants to send their data to the Master node. The slave will lower its request bits when it has no more data to transfer. The request bits are paired with error bits for each of the three data chunk sizes. If the slave sets the error bit for given message size, it will signify to the Master that there was an error in the hamming code of the last data group sent to this slave.

A slave device can request all three data sizes, the master can grant the full data path to one slave if it is the only node with requests pending. Small0, Small1, Medium0, Medium1, Large0 allowing it to send data at a rate of 436 bits per second. The Master node can transmit total data at a rate of 458 bits per second. This is either split between slaves or sent to a single slave node.

The bit fields in all frames are defined in the tables below.

TABLE 7

M0Frame Definition
M0FRAME Definition

| Data Field | Size(bits) | definition |
|---|---|---|
| Small-Data-Grant0 | 8 | Slave ID granted Small0 slot in S0FRAME, ID = 0 No grant, ID = 1-254 SLAVE ID |
| Small-Data-Grant1 | 8 | Slave ID granted Small1 slot in S0FRAME, ID = 0 No grant, ID = 1-254 SLAVE ID |
| Medium-Data-Grant0 | 8 | Slave ID granted Medium0 slot in S0FRAME, ID = 0 No grant, ID = 1-254 SLAVE ID |
| Medium-Data-Grant1 | 8 | Slave ID granted Medium1 slot in S0FRAME, ID = 0 No grant, ID = 1-15 SLAVE ID |
| Large-Data-Grant0 | 8 | Slave ID granted Large slot in S1FRAME, ID = 0 No grant, ID = 1-15 SLAVE ID, |
| Master-Data-Small0-ID | 8 | Slave ID for grant Master-Data-Small0-Data field, 0 = no data, 1-15 is slave ID, 255 = broadcast |
| Master-Data-Small0-Data | 70 | Data Field for data being sent to slave ID is in Master-Data-Small0-ID |
| Master-Data-Small1-ID | 8 | Slave ID for grant Master-Data-Small1-Data field, 0 = no data, 1-15 is slave ID, 255 = broadcast |
| Master-Data-Small1-Data | 70 | Data Field for data being sent to slave ID is in Master-Data-Medium0-ID |
| Master-Data-Medium0-ID | 8 | Slave ID for grant Master-Data-Medium0-Data field, 0 = no data, 1-15 is slave ID, 255 = broadcast |
| Master-Data-Medium0-Data | 144 | Data Field for data being sent to slave ID is in Master-Data-Medium0-ID |
| Master-Data-Medium1-ID | 8 | Slave ID for grant Master-Data-Medium1-Data field, 0 = no data, 1-15 is slave ID, 255 = broadcast |

TABLE 7-continued

M0Frame Definition
M0FRAME Definition

| Data Field | Size(bits) | definition |
|---|---|---|
| Master-Data-Medium1-Data | 144 | Data Field for data being sent to slave ID is in Master-Data-Medium1-ID |
| Parity-errorcode-block | 10 | Hamming Code covering all of the preceding bits of data in M0FRAME, hamming + extra parity bit |
| Reserved Bits | 2 | |
| Total Bits | 512 | |

TABLE 8

M1FRAME Definition
M1FRAME Definition

| Data Field | Size(bits) | definition |
|---|---|---|
| Master-Data-Large0-ID | 8 | Slave ID granted Small0 slot in S0FRAME, ID = 0 No grant, ID = 1-15 SLAVE ID, ID = 255 for broadcast |
| Master-Data-Large0-data | 488 | Slave ID granted Small1 slot in S0FRAME, ID = 0 No grant, ID = 1-15 SLAVE ID |
| Parity-errorcode-block | 10 | Hamming Code covering all of the proceeding bits of data in M0FRAME, hamming + extra parity bit |
| Reserved Bits | 6 | |
| Total Bits | 512 | |

TABLE 9

S0FRAME Definition
S0FRAME Definition

| Data Field | Size(bits) | definition |
|---|---|---|
| Slave Request/ Status | 105 | for 1 . . . 15 -> (RequestSmall, RequestMedium, RequestLarge, Errorsmall, ErrorMed, ErrorLarge, Paritybit) 7 bits per Slave × 15 slaves.. Each node can request all size packets, they may be granted both if there is no QUEUE. |
| slave-data-small0-data | 64 | Slave ID granted Small1 slot in S0FRAME, ID = 0 No grant, ID = 1-15 SLAVE ID |
| slave-data-small1-data | 64 | Slave ID granted Medium0 slot in S0FRAME, ID = 0 No grant, ID = 1-15 SLAVE ID |
| slave-data-medium0-data | 128 | Slave ID granted Medium1 slot in S0FRAME, ID = 0 No grant, ID = 1-15 SLAVE ID |
| Parity-medium0-data | 10 | Hamming code for Medium0 data |
| slave-data-medium1-data | 128 | Slave ID granted Large slot in S1FRAME, ID = 0 No grant, ID = 1-15 SLAVE ID |
| Parity-medium1-data | 10 | Hamming code for medium1 data |
| Reserved bits | 3 | Quiet bits |
| Total Bits | 512 | |

TABLE 10

S1FRAME Definition
S1FRAME Definition

| Data Field | Size(bits) | definition |
|---|---|---|
| slave-data-large0-ID | 8 | Slave ID granted Medium1 slot in S0FRAME, ID = 0 No grant, ID = 1-155 SLAVE ID |
| slave-data-large0-data | 488 | Slave ID granted Large slot in S1FRAME, ID = 0 No grant, ID = 1-15 SLAVE ID, |
| Parity-errorcode-block | 10 | Hamming Code covering all of the proceeding bits of data in M0FRAME, hamming + extra parity bit |
| Reserved Bits | 6 | |
| Total Bits | 512 | |

This system counts on precisely synchronized time to time the bits transmission and sampling at the remote node. Time is globally synchronized Atomic Time UTC that is acquired from the GPS PPS signal and maintained by low drift clocks when underwater. The data design has a two second cycle that repeats, starting at second=0 of every minute. The sequence is; (M0FRAME, S1FRAME)→ (M1FRAME, S0FRAME), as shown in Table 11 below.

TABLE 11

Cycle of Synchronized Data Transmission

| Time(sec) | master | slave |
|---|---|---|
| 0 | M0FRAME | S1FRAME |
| 1 | M1FRAME | S0FRAME |
| 2 | M0FRAME | S1FRAME |
| 3 | M1FRAME | S0FRAME |
| 4 | M0FRAME | S1FRAME |
| 5 | M1FRAME | S0FRAME |
| 6 | M0FRAME | S1FRAME |
| 7 | M1FRAME | S0FRAME |
| 8 | M0FRAME | S1FRAME |
| 9 | M1FRAME | S0FRAME |
| 10 | M0FRAME | S1FRAME |
| 11 | M1FRAME | S0FRAME |

Table 12 lists a queue of data that the master has to transmit and the slaves have to transmit. The lower part of the table shows the sequence of operations. The master can send the data as quickly as it needs to address each packet. The slaves make a request in one cycle, they may get granted in the next cycle and they can transmit in the next 2 cycles. In the example below; S>(7,15) is a coding for who is attached to the two small packet data slots. S>(small0ID, small1ID), M> is for the medium, L> is for large. If the ID is 0, the data slot is unassigned this cycle.

TABLE 12

| Data Queued for Transfer | | | | |
|---|---|---|---|---|
| | | LARGE | MEDIUM | SMALL |
| MASTER->SLAVE | | ID3 X 3, ID7 X 1 | ID1 X 2, ID12 X 2 | ID2 X 1,ID7 X 2, ID15 X 3 |
| SLAVE->MASTER | | ID3, ID7 X 2 | ID1 X 2, ID8, ID12, ID15 | ID2, ID7 X3, ID15 X 2 |

| Second | MasterData Out | Slave Requests | Master -> Slave Grant | Slave Data IN |
|---|---|---|---|---|
| 0 | S>(7,5),M>(1,12) | | L>(0),M>(0,0),S>(0,0) | S>(0,0),M>(0,0) |
| 1 | L>(3) | L>(3,7),M>(1,12),S>(2,7) | | L>(0) |
| 2 | S>(7,5),M>(1,12) | | L>(3),M>(1,12),S>(2,7) | S>(0,0),M>(0,0) |
| 3 | L>(7) | L>(7),M>(1,15),S>(7,15) | | L>(3) |
| 4 | S>(0,0),M>(0,0) | | L>(7),M>(1,15),S>(7,15) | S>(2,7),M>(1,12) |
| 5 | L>(3) | L>(7),M>(8,15),S>(7,15) | | L>(7) |
| 6 | S>(0,0),M>(0,0) | | L>(7),M>(8,15),S>(7,15) | S>(7,15),M>(1,15) |
| 7 | L>(3) | L>(0),M>(0,0),S>(0,0) | | L>(7) |
| 8 | S>(0,0),M>(0,0) | | L>(0),M>(0,0),S>(0,0) | S>(7,15),M>(8,15) |
| 9 | L>(0) | L>(0),M>(0,0),S>(0,0) | | L>(0) |

When the slaves send data, they don't send their ID since it's implicit in the fact that they were granted that slot. Slaves generate Hamming code for all medium and large data transfer blocks. The Master can pass the error state up to the next layer. The small data packets don't have room for error detect/correct but the user can assign some their data bits for redundancy. In the above example, if the system is idle the grants will all be zero. All of the unused data fields will be set to zero if not used so the system will perfectly quiet and not using any transmission energy for this time. This goes for the request bits as well.

The start of the S0FRAME has the request and error data from each remote slave device. Table 13 shows the sound travel time as measured by the positioning system.

TABLE 13

Sound Travel Time Measured by the Positioning System
S0Frame request/error Data arrives 8 bits from each node

| | Node ID | | | | | |
|---|---|---|---|---|---|---|
| | 1 | 2 | 3 | 4 | 5 | ... 15 |
| Distance (meters) | 100 | 150 | 10 | 30 | 400 | 600 |
| Sound Travel Time (ms) | 66.67 | 100.00 | 6.67 | 20.00 | 266.67 | 400.00 |

Each slave will time the frame to know the bit time to transmit and subtract the travel time out. This will allow each bit to arrive in proper time order from the Master's perspective. In the above example, node 1 will send its data 66.67 ms early to have the first bit come at the start of second 0, the next bit will be $1/512$ second later, the next $2/512$ second later and so on. Node 2 is next but it would have sent its data 100 ms early or 33.33 ms before node 1, but it will arrive exactly after node 1's data in the next time slot or $8/512$ second from the top of the second. In this example, we may assume a system range of 500 meters maximum spacing between nodes. This will describe a maximum propagation time of 0.33 seconds for any data bit between any node. This allows time for the requests to arrive and be processed before the grants are sent out at the next second. The range could be increased to over 1000 meters and still have this scheme operate with sufficient travel time for the signaling.

The time slots could be scaled larger to make the system have a longer range, i.e. 3 seconds per step would allow 3 km node spacing.

Although a few exemplary implementations have been described in detail above, other modifications are possible and within the scope of the invention. Moreover, other mechanisms for performing the systems and methods described herein may be used. In addition, the logic flows depicted in the FIGURE, table and description do not require the particular order shown, or sequential order, to achieve desirable results. Other steps may be provided, or steps may be eliminated, from the described flows, and other components may be added to, or removed from, the described systems. Accordingly, other implementations are within the scope of the following claims. In addition, a number of references may relate to the field of the invention, including U.S. Pat. No. 7,859,944 entitled "Apparatus, systems and methods for enhanced multi-carrier based underwater acoustic communications", CA Patent No. 2,054,915 entitled "Underwater communication system", U.S. Pat. No. 5,784,339 entitled "Underwater location and communication system", U.S. Pat. No. 5,124,955 entitled "Underwater communication system", an article available at http://www.mit.edu/~millitsa/resources/pdfs/marcal.pdf entitled "Slotted FAMA: a MAC protocol for underwater acoustic networks", and an article available at http://mslab.kaist.ac.kr/wikipages/files/DOTS.pdf entitled "DOTS: A Propagation Delay-aware Opportunistic MAC Protocol for Underwater Sensor Networks", which are hereby incorporated by reference in their entirety. Elements of these references may be combined with any of the elements of the invention described above.

The invention claimed is:

1. A method for communicating data underwater between at least one master node and a plurality of slave nodes, the master and slave nodes having synchronized clocks, comprising:
   defining time slots during which the master node will receive data from at least one slave node;
   a slave node calculating, using a processor having access to information regarding a distance between the slave node and the master node, a time to acoustically transmit data so that the acoustically transmitted data is received by the master node during a defined time slot;
   the slave node, at the calculated time, acoustically transmitting the data; and receiving the data transmitted by the slave node at the master node during the defined time slot.

2. The method of claim 1, wherein a plurality of slave nodes calculate, each slave node using a processor having access to information regarding a distance between the respective slave node and the master node, a time to acoustically transmit data so that the acoustically transmitted data is received by the master node during a defined time slot.

3. The method of claim 2, wherein each slave node acoustically transmits data so that the master node receives the data during a defined time slot.

4. The method of claim 3, wherein each slave node acoustically transmits data so that the master node receives the data during the same defined time slot.

5. The method of claim 3, wherein each slave node acoustically transmits data so that the master node receives the data during different defined time slots for each slave node.

6. The method of claim 1, wherein the time slots are statically defined.

7. The method of claim 1, wherein the time slots are dynamically defined.

8. The method of claim 1, wherein the system comprises a plurality of master nodes with each master node receiving acoustic transmissions at different frequencies.

9. The method of claim 1, wherein the master node receives acoustic transmissions having at least first and second frequencies.

10. The method of claim 9, wherein slave nodes communicate with the master node at the first frequency when a distance between the slave node and the master node is greater than a first threshold distance.

11. The method of claim 10, wherein slave nodes communicate with the master node at the second frequency when a distance between the slave node and the master node is less than a second threshold distance.

12. The method of claim 1, wherein a receiving node detects a Doppler shift in the frequency of a received acoustic transmission, and uses the Doppler shift to validate the acoustic transmission.

13. The method of claim 1, wherein a receiving node detects a signal amplitude of a received acoustic transmission, and uses the signal amplitude to validate the acoustic transmission.

14. The method of claim 1, wherein a receiving node detects a tone envelope shape of a received acoustic transmission, and uses the tone envelope shape to validate the acoustic transmission.

15. The method of claim 1, wherein the data is coded using phase shift keying in the defined time slots.

16. The method of claim 1, wherein the data is coded using frequency shift keying in the defined time slots.

* * * * *